(12) United States Patent
Tanaka

(10) Patent No.: US 10,919,379 B2
(45) Date of Patent: Feb. 16, 2021

(54) FUEL TANK

(71) Applicant: YAMAHA HATSUDOKI KABUSHIKI KAISHA, Iwata-shi, Shizuoka (JP)

(72) Inventor: Tatsuya Tanaka, Shizuoka (JP)

(73) Assignee: YAMAHA HATSUDOKI KABUSHIKI KAISHA, Shizuoka (JP)

( * ) Notice: Subject to any disclaimer, the term of this patent is extended or adjusted under 35 U.S.C. 154(b) by 607 days.

(21) Appl. No.: 15/600,831

(22) Filed: May 22, 2017

(65) Prior Publication Data
US 2017/0334286 A1 Nov. 23, 2017

(30) Foreign Application Priority Data
May 23, 2016 (JP) ................................. 2016-102556

(51) Int. Cl.
| | | |
|---|---|---|
| *B60K 15/00* | (2006.01) | |
| *B60K 15/035* | (2006.01) | |
| *B60K 15/04* | (2006.01) | |
| *F02M 37/00* | (2006.01) | |

(52) U.S. Cl.
CPC .. *B60K 15/03519* (2013.01); *B60K 15/03504* (2013.01); *B60K 15/0406* (2013.01); *B60K 2015/03509* (2013.01); *B60K 2015/03523* (2013.01); *B60K 2015/03528* (2013.01); *B60K 2015/03538* (2013.01); *B60K 2015/03552* (2013.01); *B60K 2015/0438* (2013.01); *B60K 2015/0451* (2013.01); *B60K 2015/0496* (2013.01); *B60Y 2200/124* (2013.01); *F02M 37/0076* (2013.01)

(58) Field of Classification Search
CPC ...... B60K 15/00; B60K 15/03; B60K 15/035; B60K 15/03519; B60K 15/03504; B60K 15/0406; B60K 15/04; B60K 15/0458; B60K 15/0477; B60K 2015/0451; B60K 2015/0438; B60K 2015/03509; B60K 2015/03523; B60K 2015/0496; B60K 2015/03552; B60K 2015/03538; B60K 2015/03528
See application file for complete search history.

(56) References Cited

U.S. PATENT DOCUMENTS

| | | | | |
|---|---|---|---|---|
| 4,573,694 A | * | 3/1986 | Goto ...................... | B60K 15/04 220/86.2 |
| 4,701,198 A | * | 10/1987 | Uranishi ............ | B01D 19/0063 123/519 |
| 4,706,708 A | * | 11/1987 | Fornuto ........... | B60K 15/03519 137/588 |

(Continued)

FOREIGN PATENT DOCUMENTS

JP           03-61496 U      6/1991

*Primary Examiner* — James M Dolak
(74) *Attorney, Agent, or Firm* — Keating and Bennett, LLP

(57) ABSTRACT

A fuel tank includes a tank main body and a fuel filler neck. A breather hole is provided in an inner surface of the fuel filler neck. A connecting pipe opens to the inside of the fuel filler neck though the breather hole and extends from the fuel filler neck in the radial direction. The inside of the fuel filler neck includes a first vapor-liquid separation chamber therein that is partitioned from the tank main body and connected to the breather hole. Liquid fuel entering the breather channel is reduced.

21 Claims, 6 Drawing Sheets

(56) References Cited

U.S. PATENT DOCUMENTS

| | | | | |
|---|---|---|---|---|
| 4,836,835 A * | 6/1989 | Harris | B60K 15/03504 | 141/286 |
| 5,033,517 A * | 7/1991 | Bucci | B60K 15/04 | 141/286 |
| 5,090,459 A * | 2/1992 | Aoki | B60K 15/035 | 141/303 |
| 5,503,199 A * | 4/1996 | Whitley, II | B60K 15/04 | 141/286 |
| 5,568,828 A * | 10/1996 | Harris | B60K 15/04 | 137/514.5 |
| 5,819,796 A * | 10/1998 | Kunimitsu | B60K 15/03519 | 137/587 |
| 5,954,367 A * | 9/1999 | Doll | B60K 15/035 | 280/834 |
| 6,405,747 B1 * | 6/2002 | King | B60K 15/03519 | 137/202 |
| 6,757,974 B2 * | 7/2004 | Kido | B21C 37/065 | 29/522.1 |
| 7,191,810 B2 * | 3/2007 | Ganachaud | B60K 15/04 | 141/301 |
| 7,198,078 B2 * | 4/2007 | Miura | B60K 15/04 | 141/285 |
| 7,617,851 B2 * | 11/2009 | Barnes | B60K 15/03504 | 137/588 |
| 8,220,508 B2 * | 7/2012 | Rongstock | B60K 15/04 | 141/372 |
| 8,443,851 B2 * | 5/2013 | Novak | B60K 15/04 | 141/198 |
| 8,714,213 B2 * | 5/2014 | Girgenrath | B60K 15/04 | 141/350 |
| 8,967,181 B2 * | 3/2015 | Wetzel | B60K 15/03519 | 137/202 |
| 9,776,506 B2 * | 10/2017 | Whelan | B60K 15/04 | |
| 9,789,760 B2 * | 10/2017 | Mizukura | B60K 15/0406 | |
| 9,803,595 B2 * | 10/2017 | Fujiwara | F02M 25/0854 | |
| 9,849,775 B2 * | 12/2017 | Eberhardt | B60K 15/04 | |
| 10,023,047 B2 * | 7/2018 | Tanaka | B60K 15/03519 | |
| 10,029,560 B2 * | 7/2018 | Sekihara | B60K 15/04 | |
| 10,086,692 B2 * | 10/2018 | Marini | B60K 15/04 | |
| 10,195,935 B2 * | 2/2019 | Goto | B60K 15/04 | |
| 10,322,631 B2 * | 6/2019 | Sasaki | B60K 15/0406 | |
| 10,344,895 B2 * | 7/2019 | Bocker | B60K 15/01 | |
| 10,407,030 B2 * | 9/2019 | Olsen | B60K 15/035 | |
| 10,465,634 B2 * | 11/2019 | Vulkan | F02M 25/08 | |
| 10,518,633 B2 * | 12/2019 | Sekihara | B60K 15/04 | |
| 10,549,628 B2 * | 2/2020 | Hagen | B60K 15/03519 | |
| 10,596,900 B2 * | 3/2020 | Bachmann | B60K 15/04 | |
| 10,625,602 B2 * | 4/2020 | Kapaun | B60K 15/04 | |
| 10,654,355 B2 * | 5/2020 | Le Mat | B01D 45/08 | |
| 10,654,356 B2 * | 5/2020 | Behnannrad | F16D 41/02 | |

* cited by examiner

FUEL TANK

CROSS-REFERENCE TO RELATED APPLICATION

The present application claims priority from Japanese Patent Application No. 2016-102556 filed on May 23, 2016, the contents of which are hereby incorporated by reference herein into this application.

BACKGROUND OF THE INVENTION

1. Field of the Invention

The present invention relates to a fuel tank mounted on a vehicle driven by a volatile fuel.

2. Description of the Related Art

Fuel tanks of vehicles driven by combustion of a volatile fuel such as gasoline include a breather channel or a breather hole to adjust the vapor pressure inside the fuel tank. In Japanese Utility Model Publication No. 1991-61496, a breather hole is provided in a filler cap which closes a filler neck of a fuel tank. The filler cap described in Japanese Utility Model Publication No. 1991-61496 includes, on the lower surface of the filler cap, a tank communicating hole that communicates with the inside of the fuel tank, and further includes, on the upper surface of the filler cap, an atmosphere communicating hole that communicates with the atmosphere. The filler cap includes a vapor-liquid separation chamber to separate the liquid fuel and the vaporized fuel. The two communicating holes are connected to each other via the vapor-liquid separation chamber. This structure prevents the liquid fuel from flowing out to the outside through the communicating holes of the filler cap.

Some conventional fuel tanks include a breather channel (for example, a hose) connected to a cylindrical filler neck. Such a fuel tank cannot use the vapor-liquid separation chamber formed in the filler cap described in Japanese Utility Model Publication No. 1991-61496, and thus easily allow liquid fuel to enter the breather channel.

SUMMARY OF THE INVENTION

Preferred embodiments of the present invention provide a fuel tank that reduces or prevents liquid fuel from entering the breather channel connected to a fuel filler neck.

A fuel tank according to a preferred embodiment of the present invention includes a tank main body including a fuel storage space; a fuel filler neck connected to the tank main body and including a breather hole on an inner surface of the fuel filler neck; a breather channel extending through the breather hole to an inside of the fuel filler neck and extending from the fuel filler neck in a radial direction of the fuel filler neck; a first vapor-liquid separation chamber inside the fuel filler neck, partitioned from the fuel storage space of the tank main body, located along the inner surface of the fuel filler neck, and connected to the breather channel through the breather hole. This fuel tank enables the breather channel to be connected to the fuel filler neck rather than the filler cap and reduce or prevent liquid fuel from entering the breather channel.

In a preferred embodiment of the fuel tank, the breather hole preferably opens into the first vapor-liquid separation chamber. This facilitates the flow of vapor near the breather hole.

In a preferred embodiment of the fuel tank, the first vapor-liquid separation chamber preferably includes a lower end below a lower edge of the breather hole. According to this structure, liquid fuel entering the first vapor-liquid separation chamber is able to be temporarily stored in the first vapor-liquid separation chamber without flowing to the breather hole.

In a preferred embodiment of the fuel tank, the first vapor-liquid separation chamber preferably includes an upper end above an upper edge of the breather hole.

In a preferred embodiment of the fuel tank, the fuel tank preferably further includes an inner cylindrical member disposed inside the fuel filler neck, wherein the first vapor-liquid separation chamber is defined by the inner cylindrical member and the inner surface of the fuel filler neck. This structure enables the vapor-liquid separation chamber to have an annular shape along the inner surface of the fuel filler neck and thus a large volume.

In a preferred embodiment of the fuel tank, a fuel return channel may be located between the inner cylindrical member and the inner surface of the fuel filler neck and extends from the first vapor-liquid separation chamber. This structure makes it possible to shorten the time to return the liquid fuel entering the first vapor-liquid separation chamber to the tank main body.

In a preferred embodiment of the fuel tank, a vapor channel is located inside the fuel filler neck to allow vapor to move between the breather hole and the fuel storage space inside the tank main.

In a preferred embodiment of the fuel tank, the vapor channel is located above the first vapor-liquid separation chamber. This structure raises the height of the vapor channel, and thus reduces or prevents liquid fuel flowing into the first vapor-liquid separation chamber through the vapor channel. In a preferred embodiment of the fuel tank, the fuel tank preferably further includes an inner cylindrical member disposed inside the fuel filler neck, wherein the first vapor-liquid separation chamber is defined by the inner cylindrical member and the inner surface of the fuel filler neck, the inner cylindrical member preferably includes a first cylindrical portion above the first vapor-liquid separation chamber, and the vapor channel is located between an outer surface of the first cylindrical portion and the inner surface of the fuel filler neck. This structure enables the vapor-liquid separation chamber to have an annular shape along the inner surface of the fuel filler neck and thus a large volume. Also, this structure raises the height of the vapor channel and thus reduces or prevents liquid fuel flowing through the vapor channel into the first vapor-liquid separation chamber.

In a preferred embodiment of the fuel tank, the vapor channel may be located below the first vapor-liquid separation chamber.

In a preferred embodiment of the fuel tank, the fuel tank preferably further includes an inner cylindrical member disposed inside the fuel filler neck, wherein the first vapor-liquid separation chamber is defined by the inner cylindrical member and the inner surface of the fuel filler neck, the inner cylindrical member includes a second cylindrical portion below the first vapor-liquid separation chamber, and the vapor channel is located between an outer surface of the second cylindrical portion and the inner surface of the fuel filler neck.

In a preferred embodiment of the fuel tank, the first vapor-liquid separation chamber preferably has an annular shape and extends along the inner surface of the fuel filler neck. This structure enables the first vapor-liquid separation chamber to extend in the circumferential direction of the filler neck and have a sufficient volume.

In a preferred embodiment of the fuel tank, a cross-sectional area of the first vapor-liquid separation chamber may be larger than a cross-sectional area of the breather channel, wherein the cross-sectional area of the first vapor-liquid separation chamber is an area of a cross section taken along a plane extending through a center line of the fuel filler neck, and wherein the cross-sectional area of the breather channel is an area of a cross section taken along a plane perpendicular to a longitudinal direction of the breather channel.

In a preferred embodiment of the fuel tank, the fuel tank may further include a second vapor-liquid separation chamber inside the fuel filler neck, located along the inner surface of the fuel filler neck, partitioned from the fuel storage space of the tank main body, and separated from the first vapor-liquid separation chamber in a vertical direction. This structure further reduces or prevents liquid fuel from entering the breather hole.

In a preferred embodiment of the fuel tank, the second vapor-liquid separation chamber may be located below the breather hole. This structure reduces or prevents liquid fuel from entering the first vapor-liquid separation chamber from the lower side of the first vapor-liquid separation chamber.

In a preferred embodiment of the fuel tank, the fuel tank may further include a first return channel connecting the first vapor-liquid separation chamber and the second vapor-liquid separation chamber, and a second return channel connecting the second vapor-liquid separation chamber and the fuel storage space inside the tank main body. This structure shortens the time for the liquid fuel entering the first vapor-liquid separation chamber to return to the tank main body and the time for the liquid fuel entering the second vapor-liquid separation chamber to return to the tank main body.

In a preferred embodiment of the fuel tank, the first return channel includes an opening that opens into the second vapor-liquid separation chamber, the second return channel includes an opening that opens into the second vapor-liquid separation chamber, the opening of the first return channel is spaced apart from the opening of the second return channel in a circumferential direction of the fuel filler neck. This structure reduces or prevents liquid fuel from entering the first vapor-liquid separation chamber through the two return channels.

In a preferred embodiment of the fuel tank, the fuel tank may further include an inner cylindrical member disposed inside the fuel filler neck, wherein each of the first vapor-liquid separation chamber and the second vapor-liquid separation chamber is defined by the inner cylindrical member and the inner surface of the fuel filler neck. This structure enables two vapor-liquid separation chambers to be easily provided.

In a preferred embodiment of the fuel tank, the fuel tank may further include an inner cylindrical member disposed inside the fuel filler neck, and a filler cap that closes the fuel filler neck, wherein the first vapor-liquid separation chamber is defined by the inner cylindrical member and the inner surface of the fuel filler neck, and the filler cap includes a cylindrical wall located inside an inner surface of the inner cylindrical member. The cylindrical wall reduces or prevents liquid fuel from entering between the first cylindrical portion of the inner cylindrical member and the inner surface of the fuel filler neck.

In a preferred embodiment of the fuel tank, the fuel tank may further include an inner cylindrical member disposed inside the fuel filler neck, wherein the inner cylindrical member includes a first cylindrical portion above the first vapor-liquid separation chamber and a third cylindrical portion below the first cylindrical portion, the first vapor-liquid separation chamber is defined by the third cylindrical portion and an inner surface of the fuel filler neck, and the inner cylindrical member includes an inclined portion extending diagonally downward and inward from a lower end of the first cylindrical portion to an upper end of the third cylindrical portion. When a nozzle of a fuel hose extending from an external fuel supply contacts the inclined portion, the nozzle is guided toward the center of the filler neck.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
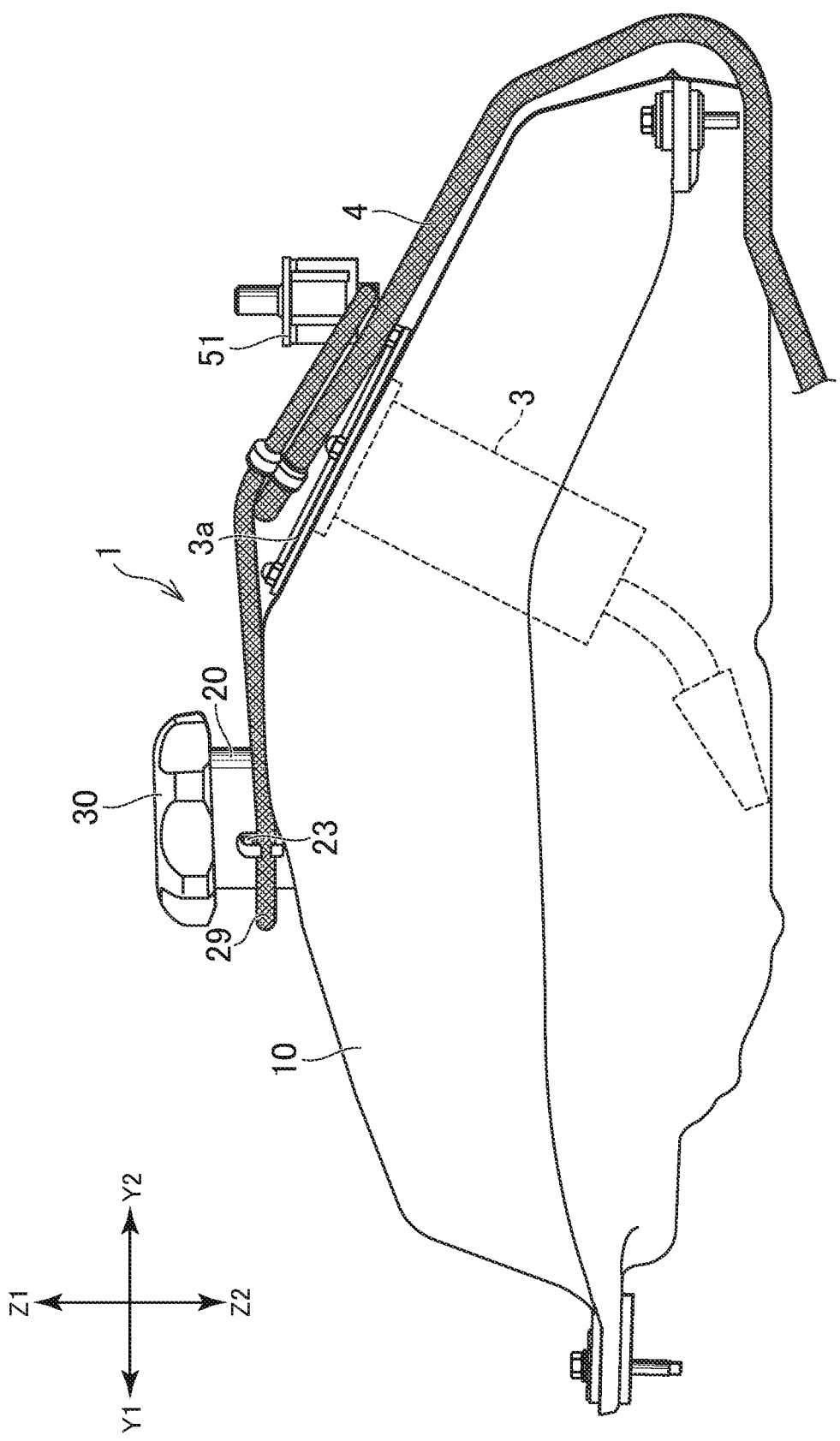
FIG. 1 is a side view showing an example of a fuel tank according to a preferred embodiment of the present invention.

Various preferred embodiments will be described. The terminology used herein is for the purpose of describing particular preferred embodiments only and is not intended to be limiting of the present invention. As used herein, the term "and/or" includes any and all combinations of one or more of the associated listed items. As used herein, the singular forms "a," "an," and "the" are intended to include the plural forms as well as the singular forms, unless the context clearly indicates otherwise. It will be further understood that the terms "comprises" "comprising" "includes" and "including" when used in this specification, specify the presence of stated features, operations, elements, and/or components, but do not preclude the presence or addition of one or more other features, operations, elements, components, and/or groups thereof.

Unless otherwise defined, all terms (including technical and scientific terms) used herein have the same meaning as commonly understood by one having ordinary skill in the art to which the present invention pertains. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

In describing various preferred embodiments of the present invention, it will be understood that a number of techniques are disclosed. Each of these has individual benefit and each can also be used in conjunction with one or more, or in some cases all, of the other disclosed techniques. Accordingly, for the sake of clarity, this description will refrain from repeating every possible combination of the individual techniques in an unnecessary fashion. Nevertheless, the specification and claims should be read with the understanding that such combinations are entirely within the scope of the present invention and the claims.

In the following description, for purposes of explanation, numerous specific details are set forth in order to provide a thorough understanding of various preferred embodiments of the present invention. However, the present invention may be practiced without these specific details.

The present disclosure is to be considered as an exemplification of the present invention, and is not intended to limit the present invention to the specific preferred embodiments illustrated by the figures or description below.

The fuel tank 1 described below may be mounted on various vehicles driven by combustion of a volatile fuel, such as four-wheel all-terrain vehicles, motorcycles, snowmobiles, four-wheel passenger cars, personal watercrafts, boats and the like.

In the following description, Y1 and Y2 shown in FIGS. 1 and 2 will be referred to as front and rear, respectively, and Z1 and Z2 will be referred to as upward and downward, respectively. Also, X1 and X2 shown in FIG. 2 are referred to as right and left, respectively.

Figure 2:
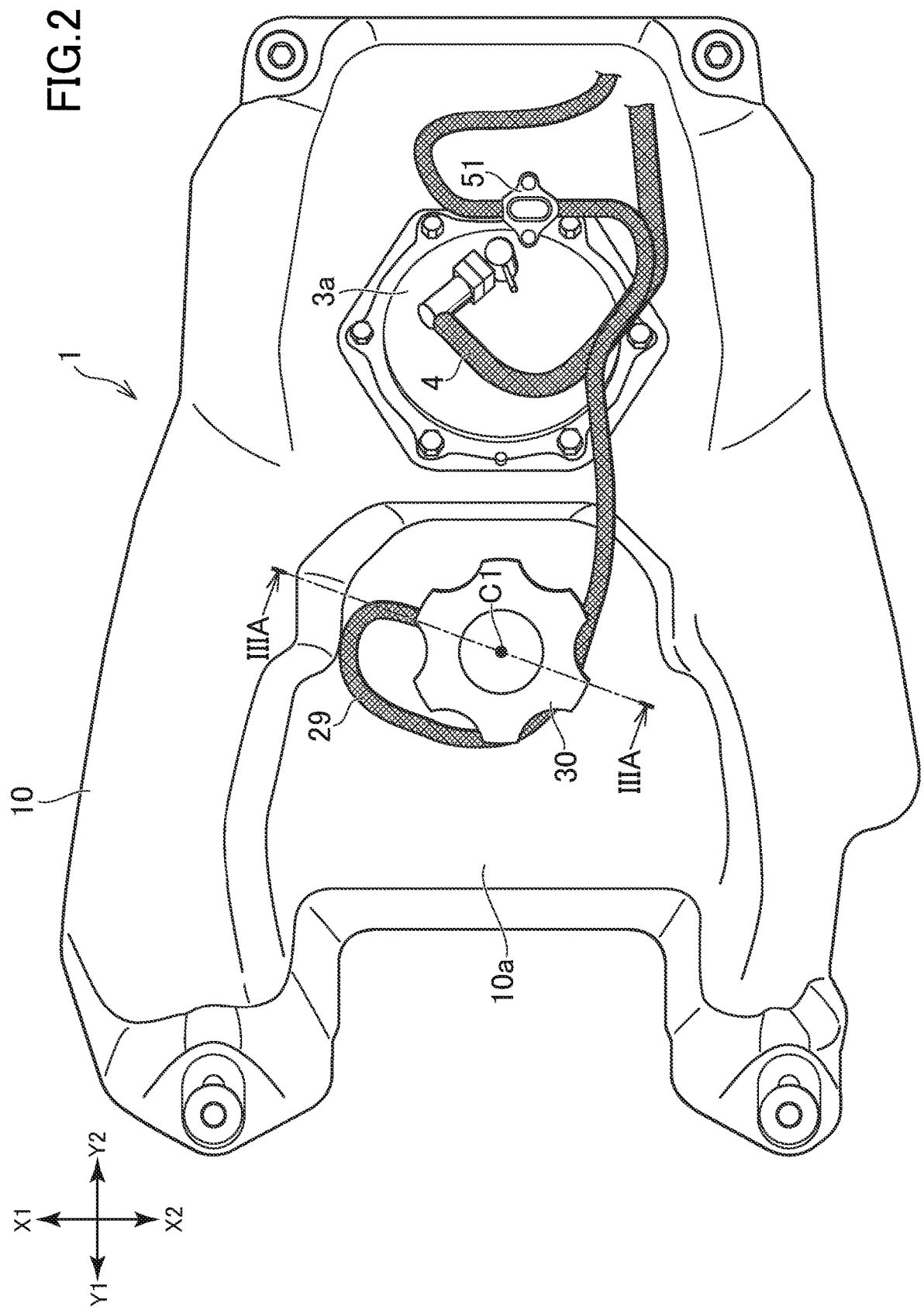
FIG. 2 is a plan view of the fuel tank.

As shown in FIGS. 1 and 2, the fuel tank 1 includes a tank main body 10 including a fuel storage space therein. The fuel stored in the tank main body 10 is a volatile fuel (for example, gasoline). The tank main body 10 is preferably made of resin, for example. The tank main body 10 may be made of metal.

Figure 3A:
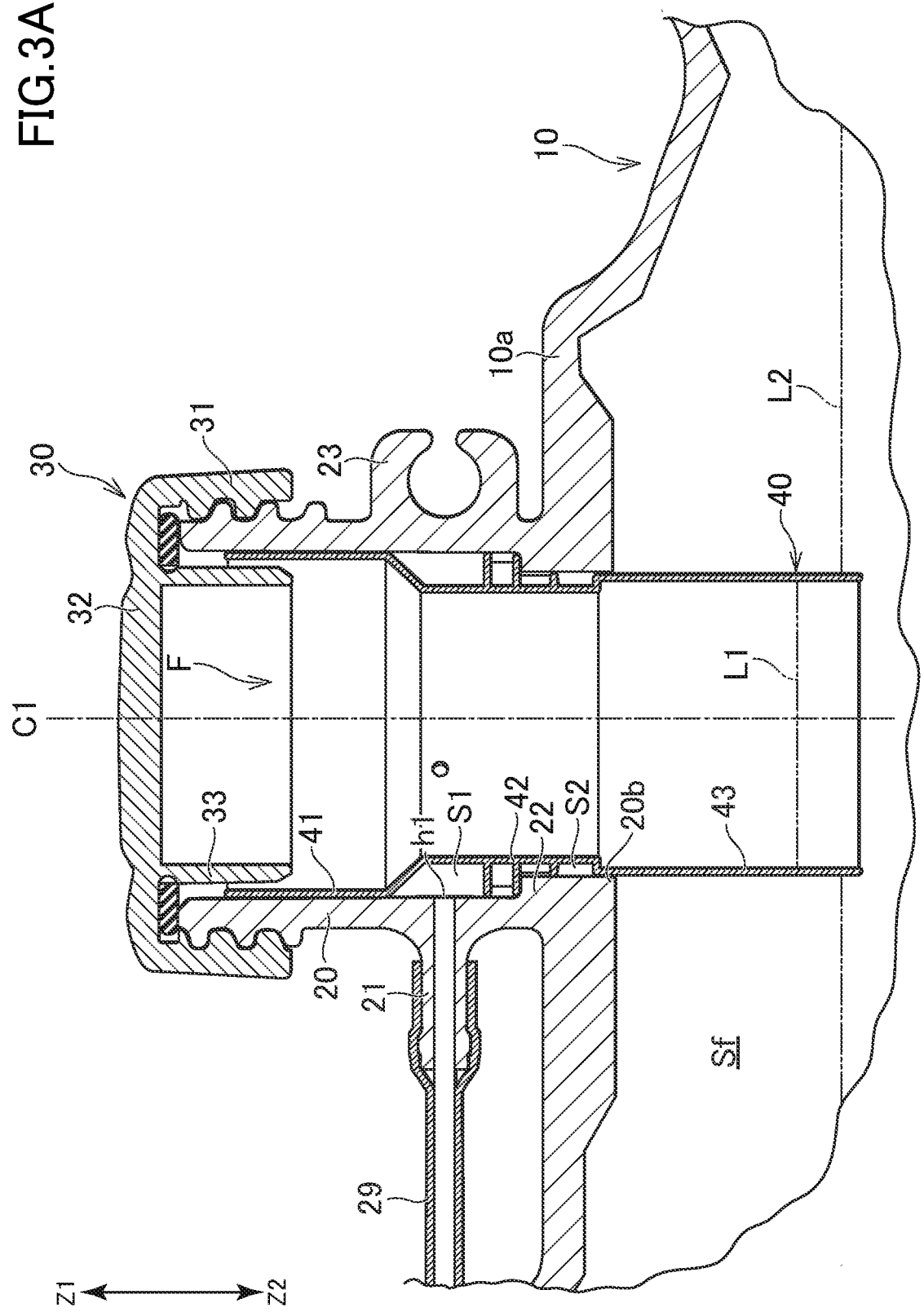
FIG. 3A is a cross-sectional view taken along the line IIIA-IIIA shown in FIG. 1.

The fuel tank 1 includes a fuel filler neck 20 connected to the tank main body 10. The fuel filler neck 20 preferably has a cylindrical shape and defines a filler opening F. As shown in FIG. 3A, the fuel filler neck 20 is connected to an upper portion of the tank main body 10, for example. In a preferred embodiment of the fuel tank 1, the fuel filler neck 20 protrudes upward from the upper wall 10a of the tank main body 10, and the filler opening F opens upward. The fuel filler neck 20 may be perpendicular or substantially perpendicular to the upper wall 10a of the tank main body 10, for example. Alternatively, the fuel filler neck 20 may extend obliquely from the upper wall 10a of the tank main body 10. That is, the filler opening F may open obliquely to the vertical direction.

Similar to the tank main body 10, the fuel filler neck 20 is preferably made of resin, for example. The fuel filler neck 20 may be made of metal. The fuel filler neck 20 is preferably integral with the tank main body 10, for example. Alternatively, the fuel filler neck 20 may be made separate from the tank main body 10, and may be fixed to the main tank body 10 by welding, for example, or may be fixed to the main tank body 10 with a fixture such as a screw or the like.

As shown in FIG. 1, the fuel tank 1 may include a fuel pump 3 disposed in the tank main body 10. In a preferred embodiment of the fuel tank 1, the fuel pump 3 includes a connector 3a in an upper portion of the fuel pump 3. The connector 3a is attached to the upper wall 10a of the tank main body 10. A fuel hose 4 is connected to the fuel pump 3. The fuel pump 3 supplies fuel through the fuel hose 4 to the engine of the vehicle on which the fuel tank 1 is mounted.

As shown in FIG. 1, in a preferred embodiment of the fuel tank 1, the fuel filler neck 20 is located forward of the connector 3a of the fuel pump 3. In addition, the fuel filler neck 20 is located in the center of the right main body 10 in the right-to-left direction (see FIG. 2). The position of the fuel filler neck 20 is not limited to that shown and described herein. For example, the connector 3a of the fuel pump 3 may be located in the front portion of the tank main body 10, and the fuel filler neck 20 may be located in the rear portion of the tank main body 10. Alternatively, the position of the fuel filler neck 20 may deviate rightward or leftward from the center of the tank main body 10 in the right-to-left direction.

The fuel tank 1 includes a filler cap 30 that closes the filler opening F as shown in FIG. 3A. The filler cap 30 includes an upper end 32 covering the filler opening F and a peripheral portion 31 extending downward from the outer periphery of the upper end 32 to surround the outside of the upper portion of the fuel filler neck 20. A screw, for example, is provided on each of the inner surface of the peripheral portion 31 and the outer surface of the fuel filler neck 20. The filler cap 30 is fixed to the fuel filler neck 20 with the screw, for example.

A breather channel is connected to the fuel filler neck 20. The vapor pressure in the tank main body 10 is adjusted by the breather channel. For example, when the vapor pressure in the tank main body 10 increases, vapor containing vaporized fuel and air inside the tank main body 10 is discharged to the outside of the fuel tank 1 through the breather channel. As a result, the vapor pressure inside the tank main body 10 decreases. Conversely, when the vapor pressure in the tank main body 10 decreases due to consumption of the liquid fuel, air flows from the breather channel into the tank main body 10 so that the vapor pressure inside the main tank body 10 is equal or substantially equal to the external air pressure.

As shown in FIG. 3A, in a preferred embodiment of the fuel tank 1, the breather channel includes a connecting pipe 21 extending from the fuel filler neck 20 and a breather hose 29 connected to the connecting pipe 21. The inner surface of the fuel filler neck 20 includes a breather hole h1 therein. The connecting pipe 21 opens into the fuel filler neck 20 through the breather hole h1. In the plan view of the filler opening F, the connecting pipe 21 extends from the fuel filler neck 20 in the radial direction of the filler opening F. In a preferred embodiment of the fuel tank 1, as shown in FIG. 3A, the connecting pipe 21 extends from the fuel filler neck 20 parallel or substantially parallel with the upper wall 10a of the tank main body 10. Alternatively, the connecting pipe 21 may be inclined to the upper wall 10a.

The connecting pipe 21 is preferably integral with the fuel filler neck 20, for example. For example, the connecting pipe 21 is made of resin together with the fuel filler neck 20. Alternatively, the connecting pipe 21 may be made separate from the fuel filler neck 20 and attached to the fuel filler neck 20.

The breather hose 29 is made of, for example, a resin such as a plastic or a flexible material (for example, rubber). As shown in FIG. 2, a valve 51 that prevents the outflow of liquid fuel may be connected to the opposite end of the breather hose 29. A hose may be connected to the valve 51. The end of the hose may be open to the atmosphere or may be connected to a canister. As shown in FIG. 1, a clamp 23 that clamps the breather hose 29 may be provided on the outer surface of the fuel filler neck 20.

When the fuel tank 1 shakes (that is, when the vehicle body rolls or pitches), the liquid fuel inside the tank main body 10 may reach the breather hole h1. In the example of the fuel tank 1 shown in FIG. 3A, vapor-liquid separation chambers S1 and S2 that reduce or prevent the liquid fuel reaching the breather hole h1 are located inside the fuel filler neck 20. The vapor-liquid separation chambers S1 and S2 are located along the inner surface of the fuel filler neck 20 and are connected to the breather hole h1. Further, the vapor-liquid separation chambers S1 and S2 are partitioned from the tank main body 10. Each of the vapor-liquid separation chambers S1 and S2 is a space that allows vapor (vaporized fuel and air) in the tank main body 10 to flow toward the breather hole h1 and is partitioned from the tank main body 10 so that the liquid fuel inside the tank main body 10 does not directly enter the vapor-liquid separation chambers S1 and S2. Hereinafter, the "vapor-liquid separation chamber" is simply referred to as "separation chamber".

In the example of the fuel tank 1 shown in FIG. 3A, a cylindrical or substantially cylindrical member 40 is disposed inside the fuel filler neck 20 (hereinafter, the member 40 will be referred to as "inner cylindrical member"). The inner cylindrical member 40 may have a center line identical to the center line C1 of the fuel filler neck 20. When a user supplies fuel to the fuel tank 1, a nozzle of a fuel hose extending from an external fuel supply facility is inserted inside the inner cylindrical member 40. The inner cylindrical member 40 is preferably a member that is separate from the fuel filler neck 20, for example. Alternatively, the inner cylindrical member 40 may be integral with the fuel filler neck 20.

The separation chambers S1 and S2 are defined between the inner surface of the fuel filler neck 20 and the outer surface of the inner cylindrical member 40 (see FIG. 3A). Such a cylindrical member 40 enables the separation chambers S1 and S2 to extend in the circumferential direction of the fuel filler neck 20, so that the volume of the separation chambers S1 and S2 is sufficient.

Figure 4:
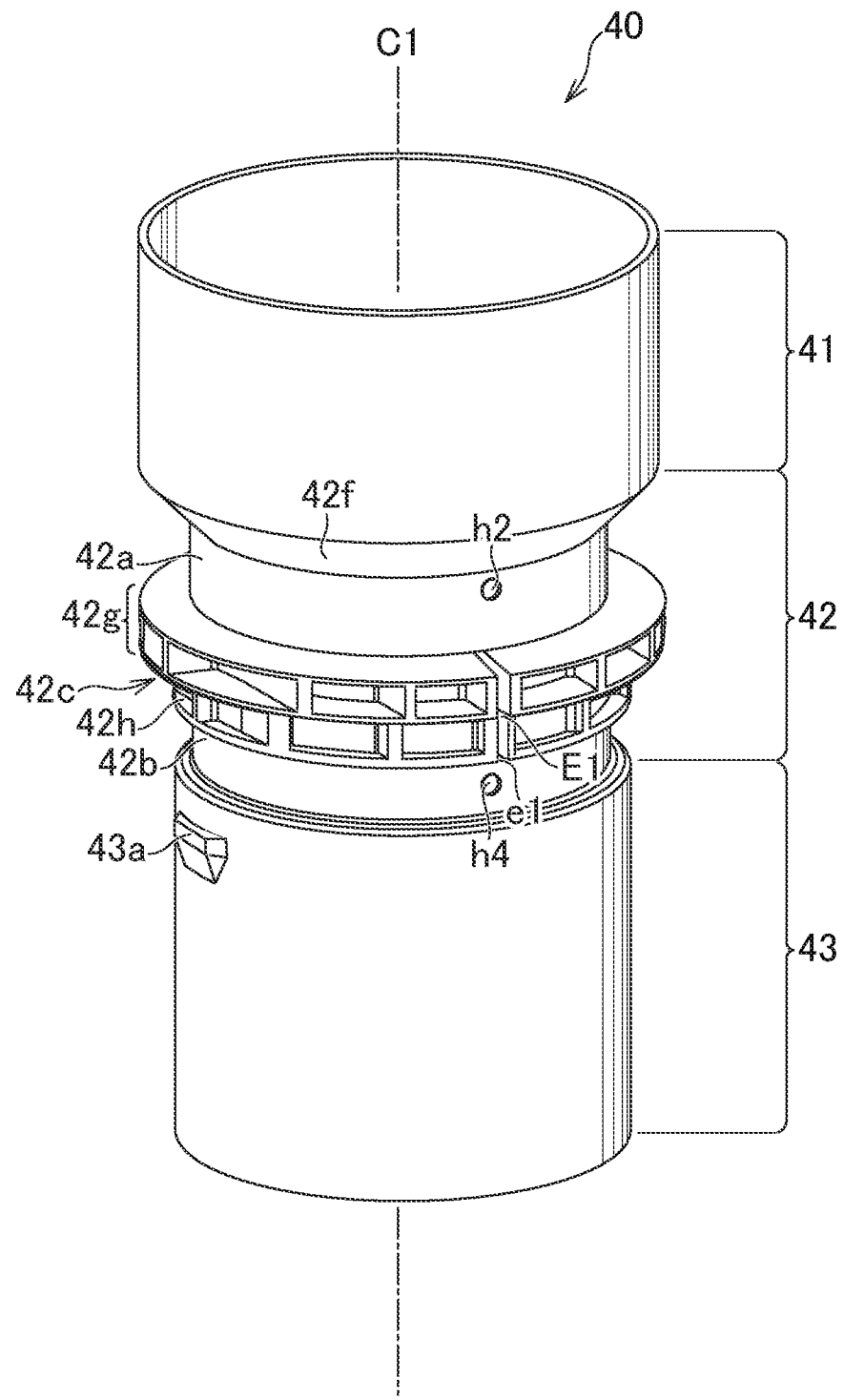
FIG. 4 is a perspective view of the inner cylindrical member included in the fuel tank.

In the example of the fuel tank 1 shown in FIG. 4, the inner cylindrical member 40 includes an upper cylindrical portion 41 that is a portion of the inner cylindrical member 40 extending in a longitudinal direction of the inner cylindrical member 40 (the longitudinal direction is a direction along the center line C1 of the fuel filler neck 20). In addition, the inner cylindrical member 40 includes a lower cylindrical portion 43 that is another portion of the inner cylindrical member 40 extending in the longitudinal direction of the inner cylindrical member 40. In addition, the inner cylindrical member 40 includes a middle cylindrical portion 42 located between the upper and lower cylindrical portions 41 and 43, wherein the middle cylindrical portion 42 is another portion of the inner cylindrical member 40 extending in the longitudinal direction of the inner cylindrical member 40. The middle cylindrical portion 42 and the inner surface of the fuel filler neck 20 are separated in the radial direction of the filler opening F. The separation chambers S1 and S2 are located between the middle cylindrical portion 42 and the inner surface of the fuel filler neck 20. The upper cylindrical portion 41, which is the upper portion of the inner cylindrical member 40, is above the separation chambers S1 and S2. The lower cylindrical portion 43, which is the lower portion of the inner cylindrical member 40, is below the separation chambers S1 and S2.

As shown in FIG. 3A, two separation chambers S1 and S2 are located inside the fuel filler neck 20. The two separation chambers S1 and S2 are separated from each other in the direction along the center line C1 of the fuel filler neck 20. In the example of the fuel tank 1 shown in FIG. 3A, the two separation chambers S1 and S2 are separated from each other in the vertical direction. This structure reduces the amount of liquid fuel entering the breather hole h1 more effectively. In the example of the fuel tank 1, the second separation chamber S2 is below the first separation chamber S1. Therefore, the second separation chamber S2 reduces the amount of liquid fuel entering the first separation chamber S1 from the lower end of the first separation chamber S1. The middle cylindrical portion 42 includes a partition 42c that protrudes in the radial direction of the filler opening F from the middle cylindrical portion 42. The partition 42c separates the two separation chambers S1 and S2 from each other. The partition 42c preferably has an annular shape surrounding the center line C1 (see FIG. 4). In the example of the fuel tank 1, the partition 42c extends over the entire circumference of the middle cylindrical portion 42. In the example of the fuel tank 1, the first separation chamber S1 is located between the upper portion 42a of the middle cylindrical portion 42 and the inner surface of the fuel filler neck 20 (hereinafter, the upper portion 42a of the middle cylindrical portion 42 is referred to as a first middle cylindrical portion). A second separation chamber S2 is located between the lower portion 42b of the middle cylindrical portion 42 and the inner surface of the fuel filler neck 20 (the lower portion 42b of the middle cylindrical portion 42 is hereinafter referred to as a second middle cylindrical portion). The number of separation chambers is not limited to two. The number of separation chambers may be one or three or more, for example.

In the example of the fuel tank 1, the first separation chamber S1 has a larger volume than the second separation chamber S2. In detail, the distance between the first middle cylindrical portion 42a and the inner surface of the fuel filler neck 20 is greater than the distance between the second middle cylindrical portion 42b and the lower edge of the inner surface of the fuel filler neck 20. Alternatively, the distance between the first middle cylindrical portion 42a and the inner surface of the fuel filler neck 20 may be the same as the distance between the second middle cylindrical portion 42b and the lower edge of the inner surface of the fuel filler neck 20. In the example of the fuel tank 1, the height of the first separation chamber S1 is larger than the height of the second separation chamber S2 (the height of the first separation chamber S1 is the distance between the upper edge and the lower edge of the first separation chamber S1 and the height of the second separation chamber S2 is the distance between the upper edge and the lower edge of the second separation chamber S2.).

Figure 3B:
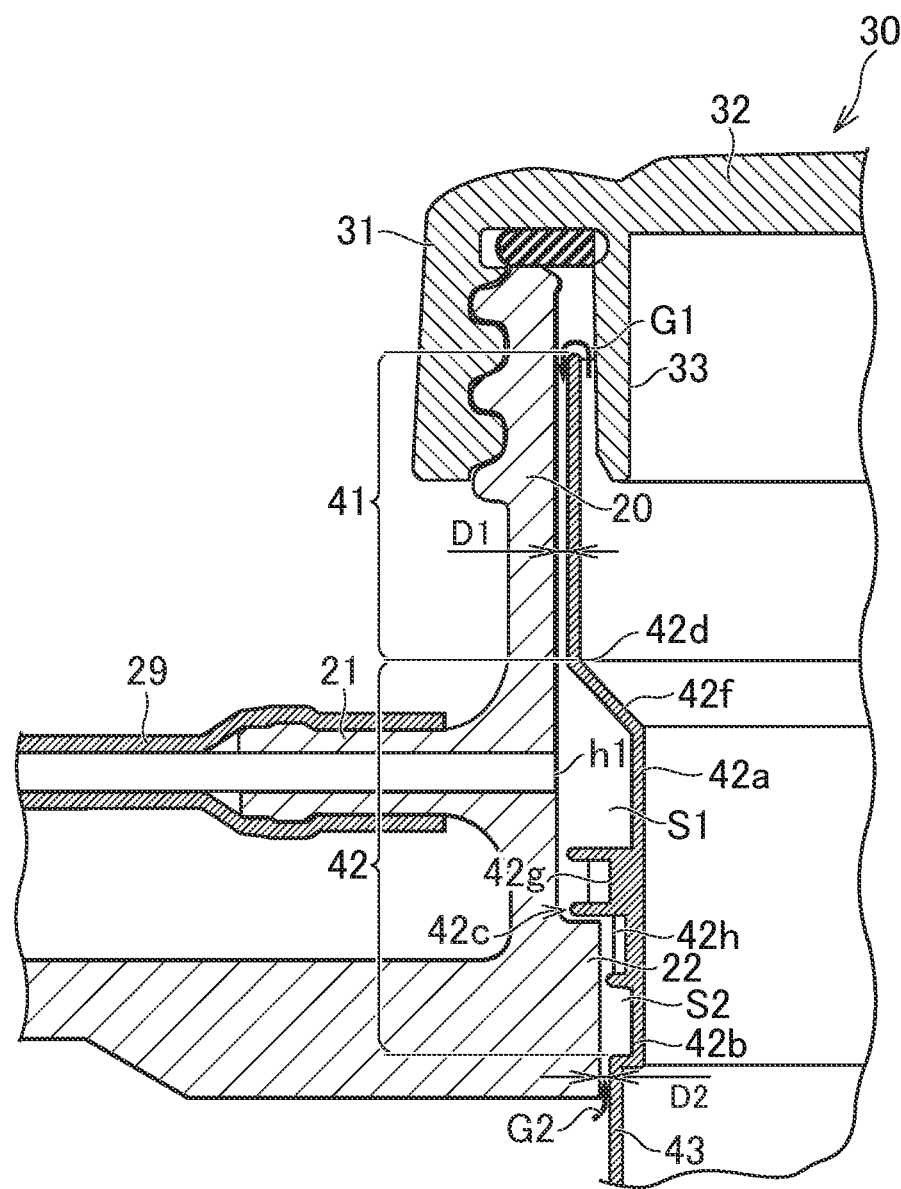
FIG. 3B is an enlarged view of FIG. 3A.

Inside the fuel filler neck 20, a channel is provided that allows vapor containing vaporized fuel and air to move between the breather hole h1 and the space inside the tank main body 10. In the example of the fuel tank 1, the vapor channel includes a gap between the outer surface of the inner cylindrical member 40 and the inner surface of the fuel filler neck 20. In detail, as shown in FIG. 3B, a slight gap is provided between the outer peripheral surface of the upper cylindrical portion 41 and the inner surface of the fuel filler neck 20. As indicated by arrow G1 in FIG. 3B, vapor is able to pass through the gap. Also, a slight gap is provided between the outer peripheral surface of the lower cylindrical portion 43 and the lower edge of the inner surface of the fuel filler neck 20. As indicated by the arrow G2 in FIG. 3B, vapor is able to pass through the gap.

As described above, a partition 42c is provided on the middle cylindrical portion 42. The outer diameter of the partition 42c is slightly smaller than the inner diameter of the fuel filler neck 20. In addition, the partition 42c is disposed on a projection 22 on the inner surface of the fuel filler neck 20, but is not fixed to the projection 22. Therefore, the vapor that has passed through the second separation chamber S2 may flow to the breather hole h1 between the partition 42c and the inner surface of the fuel filler neck 20.

As described above, the vapor channel indicated by the arrows G1 and G2 in FIG. 3B is provided inside the fuel filler neck 20 as a channel that allows vapor to move between the breather hole h1 and the space inside the tank main body 10. A vapor-liquid separation chamber is connected with the vapor channel. In the example of the fuel tank 1, the first separation chamber S1 is connected with the vapor channel indicated by the arrow G1, and the second separation chamber S2 is connected with the vapor channel indicated by the arrow G2. The vapor channel indicated by the arrow G1 is above the first separation chamber S1 so that the first separation chamber S1 is partitioned from the tank main body 10 as described below. In the example of the fuel tank 1, the first separation chamber S1 is located at the breather hole h1. That is, the breather hole h1 opens into the first separation chamber S1. Therefore, vapor moving between the breather hole h1 and the tank main body 10 always passes through the first separation chamber S1. On the other hand, the second separation chamber S2 is below the first separation chamber S1. The vapor channel indicated by the arrow G2 in FIG. 3B extends downward from the second separation chamber S2. Therefore, vapor (vapor indicated by arrow G2 in FIG. 3B) flowing between the lower cylindrical portion 43 and the inner surface of the fuel filler neck 20 passes through the second separation chamber S2 before reaching the breather hole h1.

When liquid fuel enters the gap between the inner cylindrical member 40 and the fuel filler neck 20 due to shaking of the fuel tank 1, most of the liquid fuel is trapped in the separation chambers S1 and S2. Accordingly, the separation chambers S1 and S2 reduce the amount of liquid fuel entering the breather hole h1. The liquid fuel trapped in the separation chambers S1 and S2 returns to the tank main body 10, for example, through return grooves E1 and E2 (see FIGS. 4 and 5) described below. On other hand, the separation chambers S1 and S2 allow vapor to flow towards the breather hole h1.

As described above, the fuel tank 1 includes two channels connecting the breather hole h1 and the tank main body 10. That is, the fuel filler neck 20 includes the vapor channel (the vapor channel indicated by an arrow G1 in FIG. 3B) located between the outer surface of the upper cylindrical portion 41 and the inner surface of the fuel filler neck 20, and further includes the vapor channel (the vapor channel indicated by arrow G2 in FIG. 3B) located between the outer surface of the lower cylindrical portion 43 and the lower end of the inner surface of the fuel filler neck 20. This structure smooths the flow of vapor, compared with a structure including a single channel. The number of channels is not limited to two. For example, a channel (the vapor channel indicated by arrow G1 in FIG. 3B) is preferably located between the outer surface of the upper cylindrical portion 41 and the inner surface of the fuel filler neck 20, whereas no channel may be provided between the outer surface of the lower cylindrical portion 43 and the inner surface of the fuel filler neck 20A. In this case, a vapor-liquid separation chamber may be located along the vapor channel indicated by arrow G1 in FIG. 3B. Conversely, a channel (the vapor channel indicated by arrow G2 in FIG. 3B) is located between the outer surface of the lower cylindrical portion 43 and the inner surface of the fuel filler neck 20, whereas no channel may be provided between the outer surface of the upper cylindrical portion 41 and the inner surface of the fuel filler neck 20. In this case, a vapor-liquid separation chamber may be located along the vapor channel indicated by arrow G2 in FIG. 3B.

The separation chambers S1 and S2 are partitioned from the space inside the tank main body 10. "Separation chambers S1 and S2 are partitioned from the space in the tank main body 10" indicates each of the vapor channels from the main tank body 10 to the separation chambers S1 and S2 has a structure that narrows the vapor channel in the middle thereof. In the example of the fuel tank 1, the gap between the upper cylindrical portion 41 and the inner surface of the fuel filler neck 20 partitions the separation chambers S1 and S2 from the tank main body 10. In detail, the width D1 of the gap in the radial direction of the filler opening F is smaller than the widths of the separation chambers S1 and S2 in the radial direction of the filler opening F. Similarly, the gap between the outer surface of the lower cylindrical portion 43 and the inner surface of the fuel filler neck 20 partitions the separation chambers S1 and S2 from the tank main body 10. In detail, the width D2 of the gap in the radial direction of the filler opening F is smaller than the widths of the separation chambers S1 and S2 in the radial direction of the filler opening F.

As shown in FIG. 3A, the filler cap 30 includes a cylindrical wall 33 extending downward from an upper end 32 covering the filler opening F. The cylindrical wall 33 is located inside the upper cylindrical portion 41 of the inner cylindrical member 40 in a state where the filler cap 30 is attached to the fuel filler neck 20. The lower end of the cylindrical wall 33 is positioned lower than the upper end of the upper cylindrical portion 41. Therefore, the cylindrical wall 33 overlaps the upper cylindrical portion 41 when viewed in the radial direction of the fuel filler neck 20. A slight gap is secured between the outer surface of the cylindrical wall 33 and the inner surface of the upper cylindrical portion 41. This structure bends the vapor channel from the tank main body 10 to the first separation chamber S1 and thus further reduces the liquid fuel flowing into the first separation chamber S1.

The first separation chamber S1 and the second separation chamber S2 preferably have an annular shape along the inner surface of the fuel filler neck 20. In the example of the fuel tank 1, the first separation chamber S1 and the second separation chamber S2 extend over the entire region in the circumferential direction (that is, extend over 360 degrees, for example) around the center line C1 of the fuel filler neck 20. That is, as shown in FIG. 4, the first middle cylindrical portion 42a defining the first separation chamber S1 extends over the entire region in the circumferential direction around the center line C1 of the fuel filler neck 20. Similarly, the second middle cylindrical portion 42b defining the second separation chamber S2 also extends over the entire region in the circumferential direction around the center line C1 of the fuel filler neck 20. This ensures a sufficient volume for the separation chambers S1 and S2. The structures of the separation chambers S1 and S2 are not limited to the example of fuel tank 1. The separation chambers S1 and S2 may be located only in a partial region in the circumferential direction around the center line C1 of the fuel filler neck 20 (that is, extending along an angle less than 360 degrees).

As discussed above, the breather hole h1 opens into the first separation chamber S1. As shown in FIG. 3B, the lower end (bottom) of the first separation chamber S1 is positioned lower than the lower edge of the breather hole h1. The upper end of the first separation chamber S1 is positioned higher than the upper edge of the breather hole h1. This facilitates the flow of vapor near the breather hole h1. Also, since the breather hole h1 is positioned higher than the bottom of the first separation chamber S1, liquid fuel is prevented from entering the breather hole h1 even when the liquid fuel temporarily remains in the first separation chamber S1. In the example of the fuel tank 1, the lower end of the first separation chamber S1 is defined by the partition 42c described above. The upper surface of the partition 42c is positioned lower than the lower edge of the breather hole h1.

The upper end of the first separation chamber S1 is defined by the upper edge 42d of the middle cylindrical portion 42. The upper edge 42d of the middle cylindrical portion 42 is higher than the breather hole h1.

The cross-sectional area of the first separation chamber S1 is preferably larger than the cross-sectional area of the connecting pipe 21 defining a portion of the breather channel. This enables a sufficient amount of liquid fuel to be temporarily stored in the first separation chamber S1. In other words, this prevents the liquid fuel from flowing into the breather hole h1 through the first separation chamber S1. In the present preferred embodiment, the cross-sectional area of the first separation chamber S1 is the area of the cross section taken along a plane extending through the center line C1 of the fuel filler neck 20. In the example of the fuel tank 1, since the first separation chamber S1 is annular, the first separation chamber S1 has two cross sections on the left and right sides of the inner cylindrical member 40 as shown in FIG. 3A. In the present preferred embodiment, the cross-sectional area of the first separation chamber S1 refers to the sum of the cross sections of the first separation chamber S1 obtained on the right and left sides of the inner cylindrical member 40. Alternatively, each of the cross sections of the first separation chamber S1 on the right and left sides may be larger than the cross-sectional area of the connecting pipe 21. The cross-sectional area of the connecting pipe 21 in the present preferred embodiment is an area of the cross section taken by a plane that is perpendicular to the longitudinal direction of the connecting pipe 21.

The outer surface of the first middle cylindrical portion 42a and the inner surface of the fuel filler neck 20 are separated from each other in the radial direction of the filler opening F. The distance between the first middle cylindrical portion 42a and the inner surface of the fuel filler neck 20 is larger than the gap between the outer surface of the upper cylindrical portion 41 and the inner surface of the fuel filler neck 20 and larger than the gap between the outer surface of the lower cylindrical portion 43 and the inner surface of the fuel filler neck 20. Thus, the first separation chamber S1 is defined by and located between the first middle cylindrical portion 42a and the inner surface of the fuel filler neck 20.

In the example of the fuel tank 1, the outer diameter of the first middle cylindrical portion 42a is smaller than the outer diameter of the upper cylindrical portion 41. Therefore, the outer surface of the middle cylindrical portion 42 bends toward the inside of the fuel filler neck 20 from the lower edge of the upper cylindrical portion 41 to be connected to the first middle cylindrical portion 42a. The bending of the middle cylindrical portion 42 defines a portion of the first separation chamber S1 between the first middle cylindrical portion 42a and the inner surface of the fuel filler neck 20. Alternatively, the inner surface of the fuel filler neck 20 may bend outward in the radial direction so that it extends away from the outer surface of the inner cylindrical member 40. The bending of the inner surface of the fuel filler neck 20 may define a portion of the first separation chamber S1 between the inner surface of the fuel filler neck 20 and the inner cylindrical member 40.

As shown in FIG. 3B, in the example of the fuel tank 1, the middle cylindrical portion 42 includes an inclined portion 42f extending diagonally from the lower edge of the upper cylindrical portion 41 toward the upper edge of the first middle cylindrical portion 42a. Specifically, the inclined portion 42f extends diagonally downward from the lower edge of the upper cylindrical portion 41 toward the center line C1 of the fuel filler neck 20. When a user pours fuel into the fuel tank 1 through a filler hose, the nozzle of the filler hose is inserted inside the inner cylindrical member 40. When the nozzle of the fuel hose contacts the inclined portion 42f, the inclined portion 42f guides the nozzle toward the center of the filler opening F.

As shown in FIG. 3B, the inner surface of the fuel filler neck 20 includes a projection 22 that projects toward the inside of the fuel filler neck 20. The projection 22 is located at a lower portion of the fuel filler neck 20. The inner cylindrical member 40 includes a partition 42c. The partition 42c is located on the upper side of the projection 22. More specifically, the upper portion 42g (see FIG. 4) of the partition 42c is located on the upper side of the projection 22 of the fuel filler neck 20. The upper portion 42g is also preferably annular shaped. This structure bends the vapor channel between the outer surface of the inner cylindrical member 40 and the inner surface of the fuel filler neck 20. As a result, it is possible to further reduce the liquid fuel passing between the partition 42c and the inner surface of the fuel filler neck 20 from reaching the first separation chamber S1. Also, the partition 42c and the projection 22 prevent the inner cylindrical member 40 from dropping into the tank main body 10. The lower portion 42h of the partition 42c is located inside the projection 22.

As described above, in the example of the fuel tank 1, the first separation chamber S1 is located over the entire region in the circumferential direction around the center line C1 of the fuel filler neck 20. Like the first vapor-liquid separation chamber S1, the projection 22 of the fuel filler neck 20 and the partition 42c of the inner cylindrical member 40 are annular shaped around the center line C1 of the fuel filler neck 20.

As described above, the second separation chamber S2 is spaced apart from the breather hole h1 in the direction along the center line C1 of the fuel filler neck 20. In the example of the fuel tank 1, the second separation chamber S2 is located below the height of the breather hole h1 and is below the first separation chamber S1.

The second separation chamber S2 is located between the lower portion of the middle cylindrical portion 42 and the inner surface of the fuel filler neck 20. More specifically, the second separation chamber S2 is located between the second middle cylindrical portion 42b and the inner surface of the fuel filler neck 20. In the example of the fuel tank 1, the first separation chamber S1 and the second separation chamber S2 are partitioned by the partition 42c, and the upper end of the second separation chamber S2 is defined by the partition 42c.

The second middle cylindrical portion 42b is spaced apart from the inner surface of the fuel filler neck 20 in the radial direction of the filler opening F. The distance between the second middle cylindrical portion 42b and the inner surface of the fuel filler neck 20 is larger than the gap between the outer surface of the lower cylindrical portion 43 and the inner surface of the fuel filler neck 20 and is larger than the gap between the outer surface of the upper cylindrical portion 41 and the inner surface of the fuel filler neck 20. This structure secures the second separation chamber S2 between the second middle cylindrical portion 42b and the inner surface of the fuel filler neck 20.

In the example of the fuel tank 1, the outer diameter of the second middle cylindrical portion 42b is smaller than the outer diameter of the lower cylindrical portion 43. The lower edge of the middle cylindrical portion 42 bends toward the inside of the fuel filler neck 20 from the upper edge of the lower cylindrical portion 43 to be connected to the second middle cylindrical portion 42b. This bending of the middle cylindrical portion 42 provides the second separation chamber S2 between the second middle cylindrical portion 42b and the inner surface of the fuel filler neck 20. Alternatively, the inner surface of the fuel filler neck 20 may bend outward in the radial direction of the filler opening F to be spaced apart from the outer surface of the inner cylindrical member 40. Accordingly, a second separation chamber S2 may be located between and defined by the inner surface of the fuel filler neck 20 and the inner cylindrical member 40.

Figure 5:
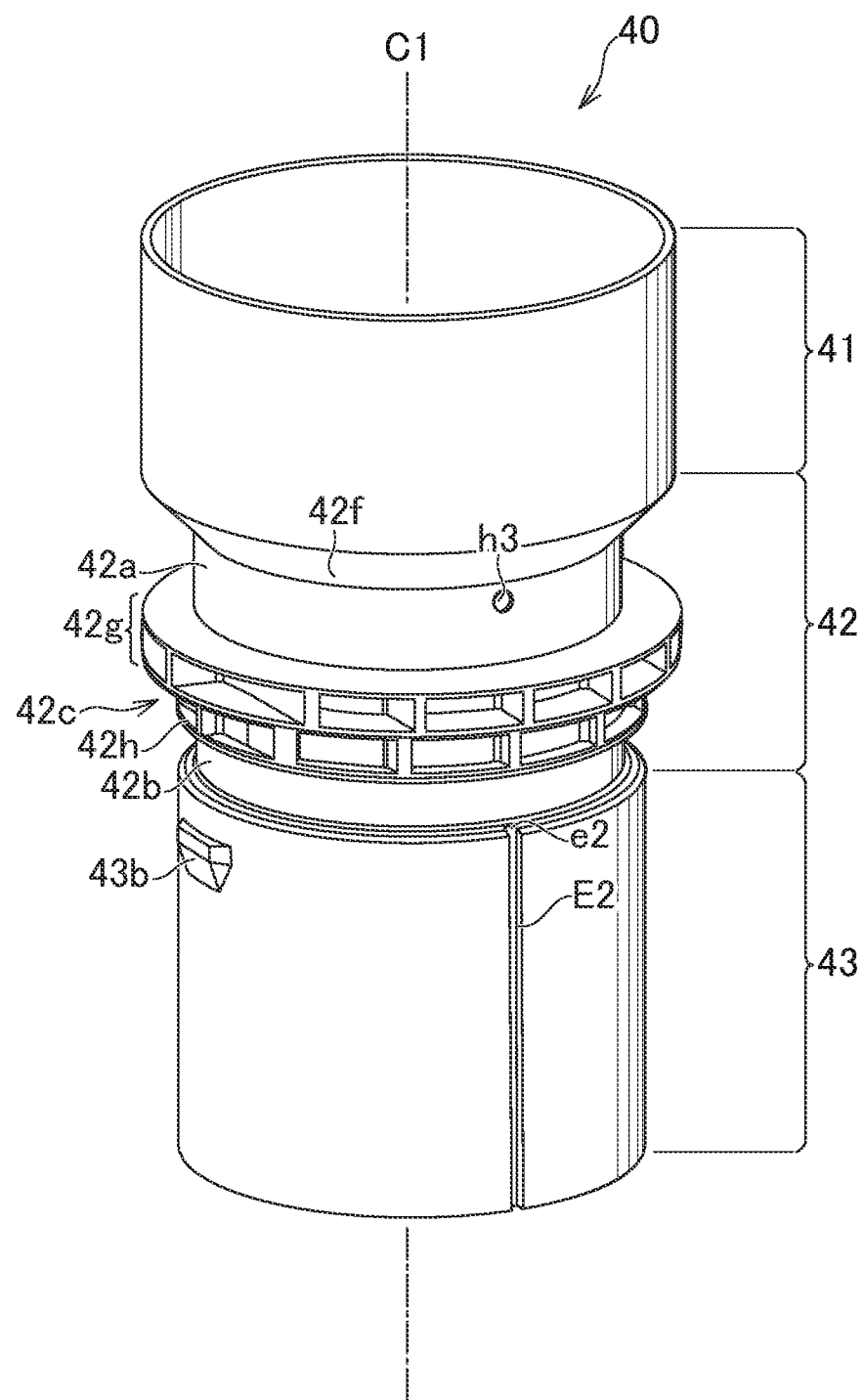
FIG. 5 is a perspective view of the inner cylindrical member included in the fuel tank.

A return channel that returns liquid fuel flowing into the vapor-liquid separation chambers S1 and S2 to the tank main body 10 is provided between the outer surface of the inner cylindrical member 40 and the inner surface of the fuel filler neck 20. For example, a groove that returns the liquid fuel flowing into the separation chambers S1 and S2 to the tank main body 10 (this groove is referred to as "return groove") is provided on at least one of the outer surface of the inner cylindrical member 40 and the inner surface of the fuel filler neck 20. In the example of the fuel tank 1, as shown in FIG. 4, a first return groove E1 connecting the first separation chamber S1 and the second separation chamber S2 is provided on the outer surface of the partition 42c of the inner cylindrical member 40. The first return groove E1 extends in the longitudinal direction of the inner cylindrical member 40, that is, extends along the center line C1 of the fuel filler neck 20. Also, as shown in FIG. 5, a second retraction groove E2 extending downward from the second middle cylindrical portion 42b is provided on the outer surface of the lower cylindrical portion 43. The two return grooves E1 and E2 define and function as a channel to return the liquid fuel flowing into the vapor-liquid separation chambers S1 and S2 to the tank main body 10.

As shown in FIGS. 4 and 5, an end e1 on the second middle cylindrical portion 42b side of the first return groove E1 and an end e2 on the second middle cylindrical portion 42b side of the second return groove E2 are spaced apart from each other in the circumferential direction of the inner cylindrical member 40 (the end e1 is the opening of the first return channel E1 and the end e2 is the opening of the second return channel E2). This structure reduces or prevents liquid fuel in the tank main body 10 from flowing into the first separation chamber S1 through return grooves E1 and E2. In the example of the fuel tank 1, the end e1 of the first return groove E1 is located on the opposite side of the end e2 of the second return groove E2 across the center of the inner cylindrical member 40. That is, the opening to the second separation chamber S2 of the first return groove E1 is shifted by 180 degrees, for example, from the opening to the second separation chamber S2 of the second return groove E2.

Note that the structure of the return channel is not limited to the example of the fuel tank 1. For example, a return groove that defines and functions as a return channel may be provided on the inner surface of the fuel filler neck 20. Also, the return channel may be inclined to the center line C1 of the fuel filler neck 20.

As shown in FIG. 3A, the inner cylindrical member 40 extends downwardly toward the inside of the tank main body 10 beyond the lower end of the fuel filler neck 20 (that is, beyond the lower end 20b (see FIG. 3A) that connects the tank main body 10 and the fuel filler neck 20). In other words, the lower cylindrical portion 43 of the inner cylindrical member 40 extends downward beyond the lower surface (inner surface) of the upper wall 10a of the tank main body 10. When an operator pours fuel into the fuel tank 1 through the filler opening F, the liquid level of fuel gradually increases in the tank main body 10. FIG. 3A shows two dot-chain lines L1 and L2 that exemplify liquid levels of fuel. When the liquid level L2 of fuel reaches the lower end of the lower cylindrical portion 43, a space Sf enclosed by the liquid surface and the inner surface of the tank main body 10 exists around the lower cylindrical portion 43. Since the gap between the outer surface of the inner cylindrical member 40 and the inner surface of the fuel filler neck 20 is narrow, vapor in the space Sf does not immediately flow into the breather hole h1. Therefore, the liquid level L2 in the space Sf does not rise at a speed corresponding to the supply speed of the fuel. Therefore, after the fuel level L2 reaches the lower end of the lower cylindrical portion 43, the fuel level L1 inside the inner cylindrical member 40 rises faster than before. This change in the rising speed of the liquid level makes the operator notice that the fuel has been sufficiently supplied to the tank main body 10, that is, that the fuel has reached the maximum amount.

As described above, the inner cylindrical member 40 that alerts the operator of the fact that fuel has been sufficiently supplied to the tank main body 10 is used as a member to create the separation chambers S1 and S2. Accordingly, the number of parts of the fuel tank 1 is reduced. The shape and structure of the inner cylindrical member 40 is not limited to the example of the fuel tank 1. For example, the lower cylindrical portion 43 may not include a portion extending below the lower surface of the upper wall 10a of the tank main body 10.

As shown in FIGS. 4 and 5, holes h2 and h3 penetrating the middle cylindrical portion 42 are provided in the middle cylindrical portion 42. In the example of the fuel tank 1, two through holes h2 and h3 are provided in the first middle cylindrical portion 42a. As described above, after the liquid level L2 of the fuel reaches the lower end of the inner cylindrical member 40, a difference is caused between the height of the liquid level L1 inside the inner cylindrical member 40 and the height of the liquid level L2 outside the inner cylindrical member 40. At this time, since the air in the space Sf is discharged to the outside through the through holes h2 and h3, the difference between the height of the liquid surface L1 inside the inner cylindrical member 40 and the height of the liquid surface L2 outside the inner cylindrical member 40 is reduced in a short time. In the example of the fuel tank 1, as shown in FIG. 4, a hole h4 penetrating the second middle cylindrical portion 42b is also provided in the second middle cylindrical portion 42b. Therefore, the air in the space Sf is discharged to the outside through the through hole h4. Alternatively, the through hole h4 may not be included.

As shown in FIGS. 4 and 5, projections 43a and 43b are provided on the outer surface of the lower cylindrical portion 43 of the inner cylindrical member 40. The protrusions 43a and 43B engage, for example, the lower end 20b of the fuel filler neck 20 to prevent the inner cylindrical member 40 from dropping from the fuel filler neck 20.

The present invention is not limited to the preferred embodiments of the fuel tank 1 described above, and various modifications may be made to the fuel tank.

In a preferred embodiment of the fuel tank 1, the fuel filler neck 20 preferably includes the inner cylindrical member 40 disposed therein and having a center line that coincides with the center line C1 of the fuel filler neck 20, and the inner cylindrical member 40 defines the separation chambers S1 and S2. However, the member that defines the separation chambers S1 and S2 is not limited to the inner cylindrical member 40. For example, a member surrounding the breather hole h1 may be attached to the inner surface of the fuel filler neck 20. This member may include an opening provided thereon for vapor to flow to the breather hole h1.

Alternatively, the fuel tank 1 may not include two separation chambers S1 and S2. The fuel tank 1 may only include a first separation chamber S1 located at the breather hole h1.

Alternatively, the first separation chamber S1 may not be located at the breather hole h1. For example, the first separation chamber S1 may be above the breather hole h1. In this case, the second separation chamber S2 may be below the breather hole h1.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A fuel tank comprising:
a tank main body including a fuel storage space;
a fuel filler neck connected to an upper wall of the tank main body and including a breather hole at an inner surface of the fuel filler neck;
a connecting pipe opening into the fuel filler neck through the breather hole and extending from the fuel filler neck in a radial direction of the fuel filler neck;
a first vapor-liquid separation chamber inside the fuel filler neck, partitioned from the fuel storage space of the tank main body, located along the inner surface of the fuel filler neck, and connected to the connecting pipe through the breather hole; and
an inner cylindrical member inside the fuel filler neck; wherein
the first vapor-liquid separation chamber is defined by the inner cylindrical member and the inner surface of the fuel filler neck; and
the inner cylindrical member extends beyond an inner surface of the upper wall of the tank main body to an inside of the tank main body.

2. The fuel tank according to claim 1, wherein the breather hole opens into the first vapor-liquid separation chamber.

3. The fuel tank according to claim 1, wherein the first vapor-liquid separation chamber includes a lower end below a lower edge of the breather hole.

4. The fuel tank according to claim 1, wherein the first vapor-liquid separation chamber includes an upper end above an upper edge of the breather hole.

5. The fuel tank according to claim 1, further comprising a fuel return channel located between the inner cylindrical member and the inner surface of the fuel filler neck and extending from the first vapor-liquid separation chamber.

6. The fuel tank according to claim 1, further comprising a vapor channel inside the fuel filler neck that allows vapor to move between the breather hole and the fuel storage space inside the tank main body.

7. The fuel tank according to claim 6, wherein the vapor channel is above the first vapor-liquid separation chamber.

8. A fuel tank comprising:
a tank main body including a fuel storage space;
a fuel filler neck connected to the tank main body and including a breather hole at an inner surface of the fuel filler neck;
a connecting pipe opening into the fuel filler neck through the breather hole and extending from the fuel filler neck in a radial direction of the fuel filler neck;
a first vapor-liquid separation chamber inside the fuel filler neck, partitioned from the fuel storage space of the tank main body, located along the inner surface of the fuel filler neck, and connected to the connecting pipe through the breather hole;
a vapor channel inside the fuel filler neck that allows vapor to move between the breather hole and the fuel storage space inside the tank main body; and
an inner cylindrical member inside the fuel filler neck; wherein
the vapor channel is above the first vapor-liquid separation chamber;
the first vapor-liquid separation chamber is defined by the inner cylindrical member and the inner surface of the fuel filler neck;
the inner cylindrical member includes an upper cylindrical portion above the first vapor-liquid separation chamber; and
the vapor channel is defined by an outer surface of the upper cylindrical portion and the inner surface of the fuel filler neck.

9. The fuel tank according to claim 6, wherein the vapor channel is below the first vapor-liquid separation chamber.

10. A fuel tank comprising:
a tank main body including a fuel storage space;
a fuel filler neck connected to the tank main body and including a breather hole at an inner surface of the fuel filler neck;
a connecting pipe opening into the fuel filler neck through the breather hole and extending from the fuel filler neck in a radial direction of the fuel filler neck; and a first vapor-liquid separation chamber inside the fuel filler neck, partitioned from the fuel storage space of the tank main body, located along the inner surface of the fuel filler neck, and connected to the connecting pipe through the breather hole;
a vapor channel inside the fuel filler neck that allows vapor to move between the breather hole and the fuel storage space inside the tank main body; and
an inner cylindrical member inside the fuel filler neck; wherein
the vapor channel is below the first vapor-liquid separation chamber;
the first vapor-liquid separation chamber is defined by the inner cylindrical member and the inner surface of the fuel filler neck;
the inner cylindrical member includes a lower cylindrical portion below the first vapor-liquid separation chamber; and
the vapor channel is defined by an outer surface of the lower cylindrical portion and the inner surface of the fuel filler neck.

11. The fuel tank according to claim 1, wherein the first vapor-liquid separation chamber is annular shaped and extends along the inner surface of the fuel filler neck.

12. The fuel tank according to claim 1, wherein a cross-sectional area of the first vapor-liquid separation chamber is larger than a cross-sectional area of the connecting pipe, the cross-sectional area of the first vapor-liquid separation chamber is an area of a cross section taken along a plane including a center line of the fuel filler neck, and the cross-sectional area of the connecting pipe is an area of a cross section taken along a plane that is perpendicular to a longitudinal direction of the connecting pipe.

13. The fuel tank according to claim 1, further comprising a second vapor-liquid separation chamber inside the fuel filler neck, located along the inner surface of the fuel filler neck, partitioned from the fuel storage space of the tank main body, and separated from the first vapor-liquid separation chamber in a vertical direction.

14. The fuel tank according to claim 13, wherein the second vapor-liquid separation chamber is below the breather hole.

15. The fuel tank according to claim 14, further comprising:
- a first return channel connecting the first vapor-liquid separation chamber and the second vapor-liquid separation chamber; and
- a second return channel connecting the second vapor-liquid separation chamber and the fuel storage space inside the tank main body.

16. The fuel tank according to claim 15, wherein
the first return channel includes an opening that opens into the second vapor-liquid separation chamber;
the second return channel includes an opening that opens into the second vapor-liquid separation chamber; and
the opening of the first return channel is spaced apart from the opening of the second return channel in a circumferential direction of the fuel filler neck.

17. The fuel tank according to claim 13, wherein
each of the first vapor-liquid separation chamber and the second vapor-liquid separation chamber is defined by the inner cylindrical member and the inner surface of the fuel filler neck.

18. The fuel tank according to claim 1, further comprising:
- a filler cap that closes the fuel filler neck; wherein
the filler cap includes a cylindrical wall inside an inner surface of the inner cylindrical member.

19. A fuel tank comprising:
- a tank main body including a fuel storage space;
- a fuel filler neck connected to the tank main body and including a breather hole at an inner surface of the fuel filler neck;
- a breather channel extending through the breather hole to an inside of the fuel filler neck and extending from the fuel filler neck in a radial direction of the fuel filler neck;
- a first vapor-liquid separation chamber inside the fuel filler neck, partitioned from the fuel storage space of the tank main body, located along the inner surface of the fuel filler neck, and connected to the breather channel through the breather hole; and
- an inner cylindrical member inside the fuel filler neck; wherein
the inner cylindrical member includes an upper cylindrical portion above the first vapor-liquid separation chamber and a middle cylindrical portion below the upper cylindrical portion;
the first vapor-liquid separation chamber is defined by the middle cylindrical portion and an inner surface of the fuel filler neck; and
the inner cylindrical member includes an inclined portion extending diagonally downward and inward from a lower end of the upper cylindrical portion to an upper end of the middle cylindrical portion.

20. A fuel tank comprising:
- a tank main body including a fuel storage space;
- a fuel filler neck connected to the tank main body and including a breather hole at an inner surface of the fuel filler neck;
- a breather channel extending through the breather hole to an inside of the fuel filler neck and extending from the fuel filler neck in a radial direction of the fuel filler neck;
- a first vapor-liquid separation chamber inside the fuel filler neck, partitioned from the fuel storage space of the tank main body, located along the inner surface of the fuel filler neck, and connected to the breather channel through the breather hole; and
- a vapor channel inside the fuel filler neck that allows vapor to move between the breather hole and the fuel storage space inside the tank main body; wherein
the breather channel is located closer to an upper wall of the tank main body than to an upper end of the fuel filler neck.

21. The fuel tank according to claim 20, wherein the breather hole is located closer to the upper wall of the tank main body than to the upper end of the fuel filler neck.

\* \* \* \* \*